(12) United States Patent
Sharp

(10) Patent No.: US 8,275,658 B2
(45) Date of Patent: Sep. 25, 2012

(54) METHOD AND APPARATUS FOR EMBEDDING ADVERTISEMENTS IN AUDIO FILES FOR INTERNET AND NETWORK DISTRIBUTION

(75) Inventor: Michael A. Sharp, Porter, TX (US)

(73) Assignee: Ads in Downloads, LLC, Marshall, TX (US)

( * ) Notice: Subject to any disclaimer, the term of this patent is extended or adjusted under 35 U.S.C. 154(b) by 4241 days.

(21) Appl. No.: 09/765,985

(22) Filed: Jan. 19, 2001

(65) Prior Publication Data

US 2007/0276673 A1    Nov. 29, 2007

Related U.S. Application Data

(60) Provisional application No. 60/177,534, filed on Jan. 21, 2000.

(51) Int. Cl.
*G06Q 30/00*    (2006.01)
(52) U.S. Cl. ............. 705/14.4; 705/14.15; 705/14.69; 705/14.73
(58) Field of Classification Search ............. 705/14.4, 705/14.15, 14.69, 14.73
See application file for complete search history.

(56) References Cited

U.S. PATENT DOCUMENTS

| | | | |
|---|---|---|---|
| 5,557,541 A * | 9/1996 | Schulhof et al. ............. 700/94 |
| 5,572,643 A | 11/1996 | Judson | |
| 5,703,995 A * | 12/1997 | Willbanks ..................... 386/52 |
| 5,721,827 A * | 2/1998 | Logan et al. ................ 709/217 |
| 5,737,619 A | 4/1998 | Judson | |
| 5,819,092 A | 10/1998 | Ferguson et al. | |
| 5,838,314 A * | 11/1998 | Neel et al. ..................... 725/8 |
| 5,870,724 A | 2/1999 | Lawlor et al. | |
| 5,931,901 A * | 8/1999 | Wolfe et al. ................ 709/206 |
| 5,950,173 A | 9/1999 | Perkowski | |
| 5,987,454 A | 11/1999 | Hobbs | |
| 6,029,045 A | 2/2000 | Picco et al. | |
| 6,036,601 A * | 3/2000 | Heckel ......................... 463/42 |
| 6,351,736 B1 * | 2/2002 | Weisberg et al. ......... 705/14.46 |
| 6,381,314 B1 * | 4/2002 | Walinski ................. 379/101.01 |
| 7,047,302 B1 * | 5/2006 | Chatani et al. ............. 709/229 |

OTHER PUBLICATIONS

AMP3.com and AudioSoft Join Forces to Bring Back the Single; The Fastest-growing New MP3 Site on the Internet Now Offers E-commerce to Visitors and Copyright Security for Artists, Business Wire, Mar. 18, 1999, findarticles.com/p/articles/mi_m0EIN/is_1999_18/ai_54142575.
Jon Iverson, Peace, Love and Marketing, Stereophile, Jul. 4, 1999, http://www.stereophile.com/news/10485/index/html.

(Continued)

*Primary Examiner* — John Weiss
*Assistant Examiner* — Krishan Mittal
(74) *Attorney, Agent, or Firm* — Klarquist Sparkman, LLP

(57) ABSTRACT

A method for distribution of advertising that includes combining an audio data file that produces an advertising message when processed with a data file that produces a performance of a musical composition when processed. Alternatively the invention may be viewed as a method for distribution of music which includes providing a server connected to a computer network, permitting message data files to be provided for a fee paid by the party providing the message, purchasing rights to multimedia data files from owners of such rights and making available to end users data files comprising a message and a licensed multimedia file by a connection to the network server. Preferably the method provides a multimedia file that comprises a musical composition. An especially preferred embodiment provides a multimedia data file that is an MP3 file comprising a musical composition.

12 Claims, 8 Drawing Sheets

OTHER PUBLICATIONS

Matt Richtel, Some Free Music Sites Start Paying Artists, New York Times, Nov. 12, 1999, www.nytimes.com/library/tech/99/11/cyber/articles/16music.html.

Digital Music Distribution, The MP3 and Internet Audio Handbook, Mar. 1, 2000, www.amp3.com.

Clare Haney, Computerworld Hong Kong, Mar. 6, 2000, http://archives.cnn.com.2000/TECH/computing/03/06/china.mp3.idg/index.html.

Scot Hacker, MP3: The Definitive Guide, Mar. 15, 2000, pp. 21 and 400, First Edition, O'Reilly.

Power to the Artist-amp3.com, Gateway Support, http://support.gateway.com/s/tutorials/Tu_844710.shtml.

Sean McManus, A short history of bands online, Sean McManus, Aug. 2003, http://www.sean.co.uk/a/musicjournalism/var/historyofbandsites.shtm.

Marshall Kirkpatrick, More (mostly) free music: EMI to partner with SpiralFrog, Techcrunch, Sep. 5, 2006, http://www.techcrunch.com/2006/09/05/emi-to-add-free-music-to-spiralfrog/.

Sean McManus, Prompt's TechBlog, Prompt Communications, Apr. 30, 2007, http://www.prompt-communications.com/blog/2007/04/peter-grabriels-we7-launches-ad.html.

Ad supported music downloads, The SpotLight Archive, Feb. 4, 2008, www.we7.com/public/press.

Bill Mann, How to download, rip & play digital music, I want my MP3!, Chapter 10, p. 185, Oct. 13, 1999, McGraw-Hill Companies.

Guy Hart-Davis, et al., I didn't know I could do that, MP3!, p. 46, 2000, Sybex, Inc.

Rod Underhill, et al., The Complete Idiot's Guide to MP3: Music on the Internet, pp. 66-67, 154, Jan. 15, 2000, Alphabooks.

Austerberry, David, "Declaration Under 37 CRF 1.132", dated Jun. 13, 2008, re: U.S. Appl. No. 09/765,985, filed Jan. 19, 2001, pp. 1-5.

* cited by examiner

FIG. 7

METHOD AND APPARATUS FOR EMBEDDING ADVERTISEMENTS IN AUDIO FILES FOR INTERNET AND NETWORK DISTRIBUTION

RELATED APPLICATIONS

This application is a continuation in part of provisional patent application Ser. No. 60/177,534, filed Jan. 21, 2000 and now abandoned by operation of law.

TECHNICAL FIELD

The present invention relates to distribution of advertising via computer networks. More particularly, the present invention relates to a method and apparatus for embedding advertisements in computer files, such as audio files, for distribution over the Internet, intranets or any other computer or digital network.

BACKGROUND OF THE INVENTION

Electronic commerce on the Internet is a booming business model. Many e-commerce Internet businesses rely on advertising revenues as an important part of their revenue model. A vast majority of the Internet e-commerce sites rely on banner ads as the primary form of advertising at their sites. The present invention discloses an improvement over existing advertising models by disclosing a method and apparatus which enables e-commerce operators to deliver advertising to web site visitors and users by electronically embedding advertisements in computer files, such audio files, downloaded by the web site users. This invention causes the web site user (or the ultimate end user) to hear and/or see the advertisement as part of the file downloaded by the user.

In the prior art inserting advertising onto the users computer during downloading of a web page is disclosed by Judson U.S. Pat. Nos. 5,732,619 and 5,572,643. Advertising inserted into a home banking transaction is disclosed in U.S. Pat. No. 5,870,724. Advertising inserted into applications is disclosed in U.S. Pat. No. 5,819,092. Perkowski, U.S. Pat. No. 5,950,173 discloses a system and method for delivering consumer product related information to consumers within retail environments using internet-based information servers and sales agents. Hobbs, U.S. Pat. No. 5,987,454 discloses a method and apparatus for selectively augmenting retrieved text, numbers, maps, charts, still pictures and/or graphics, moving pictures and/or graphics and audio information from a network resource. Picco et al U.S. Pat. No. 6,029,045 discloses a system and method for inserting local content into programming content. Heckel, U.S. Pat. No. 6,036,601 discloses a method for advertising over a computer network utilizing virtual environments of games. None of these references suggest the advantage of providing a downloadable audio file having inserted therein a second message such as an advertisement.

SUMMARY OF THE INVENTION

The invention in one embodiment provides a multimedia or audio data file suitable for transmission over a computer network that comprises a first segment having data which results in the delivery of a commercial advertising message when the data file is processed and a second segment comprising data which results in the performance of a musical composition when the data file is executed. Preferably the data file is in a way file format, more preferably it is in a compressed file format, most preferably it is in an MP3 format. Alternatively the invention may be viewed as a method for distribution of advertising that comprises combining an audio data file that produces an advertising message when processed with a data file that produces a performance of a musical composition when processed. Preferably the method includes the step wherein the files are combined by use of a sound editor. More preferably the files are combined by use of a hexadecimal editor.

Alternatively the invention may be viewed as a method for distribution of music which comprises providing a server connected to a computer network, permitting message data files to be provided for a fee paid by the party providing the message, purchasing rights to multimedia data files from owners of such rights and making available to endusers data files comprising a message and a licensed multimedia file by a connection to the network server. Preferably the method provides a multimedia file that comprises a musical composition. An especially preferred embodiment provides a multimedia data file that is an MP3 file comprising a musical composition.

BRIEF DESCRIPTION OF THE DRAWINGS

FIG. 7 illustrates a combined file according to the invention in a hexadecimal editor.

DETAILED DESCRIPTION OF THE INVENTION

Figure 1:
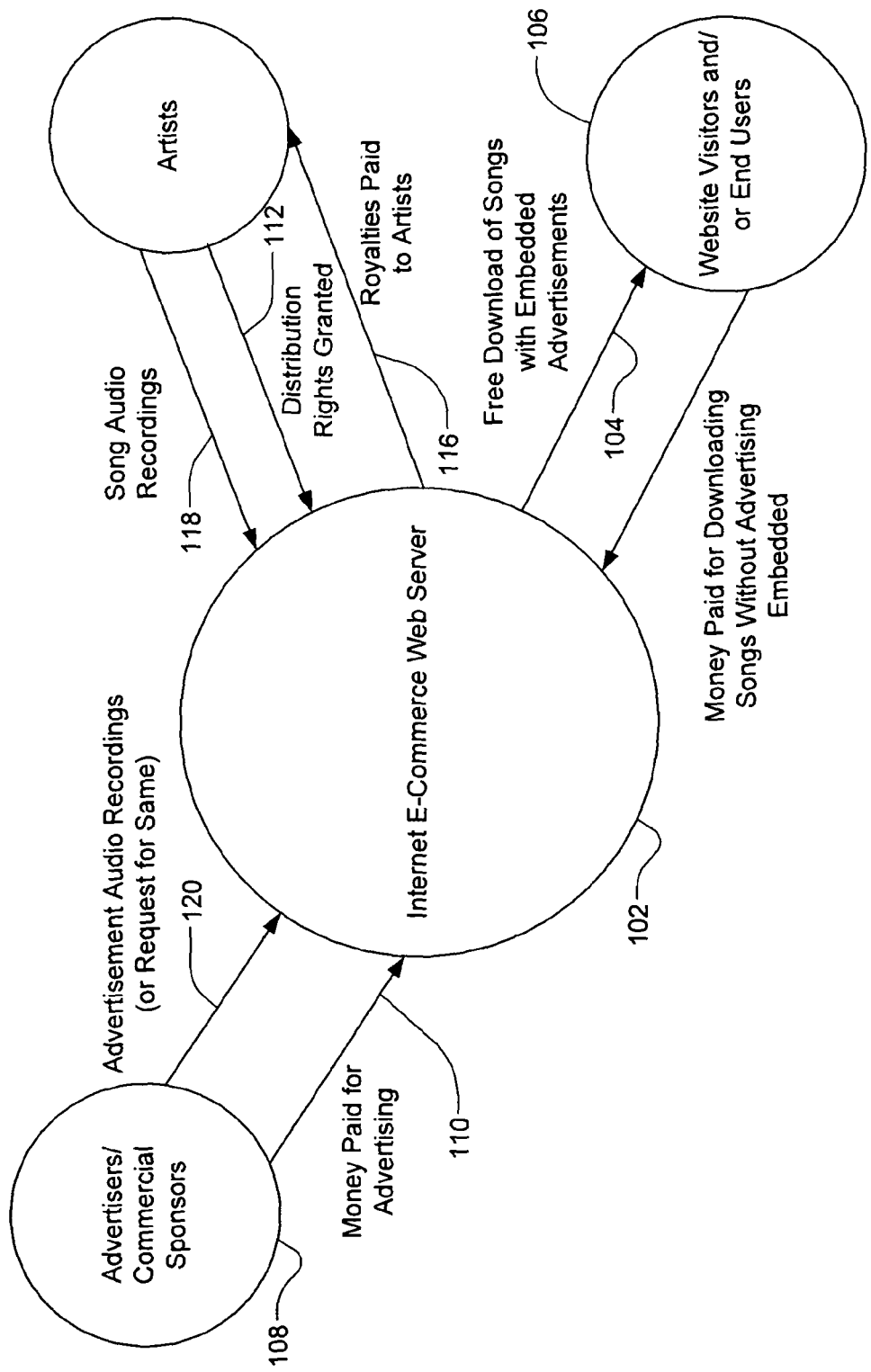
FIG. 1 is a schematic of the distribution system according to the invention.

Referring to FIG. 1, in the preferred embodiment of the present invention, a web server 102 makes songs or singles available for free download 104 by web site visitors 106. Each single is a computer audio file containing a song with an advertisement appended to the beginning of the song. For example, a single containing a song by the artist Billy Joel, may have a five-second (or longer) advertisement or jingle at the beginning of the song. The jingle might say something like: "This song is brought to you by Nike." The jingle may be a recording of spoken words or lyrics only, or the jingle may contain both lyrics and music. In any event, a song follows the jingle, in this case a single by Billy Joel.

Advertisers 108 pay a certain sum of money 110 to the web server or e-commerce site operator/owner for having the advertisement appended to particular singles. Advertisers may choose to target specific markets by choosing particular songs or particular genres of music. The web site operator or owner acquires the right 112 to distribute the songs from artists 114. In exchange for the distribution rights 112, the web site owner/operator pays certain royalties 116 to the artists. While there are many different ways of computing a royalty, in the preferred embodiment the artist receives five cents each time the artist's song is downloaded. Furthermore, the artist's song receives exposure to consumers all across the world through the Internet. This may be particularly attractive to lesser-known or new artists who have not been successful at signing a recording contract with traditional recording studios and/or music publishers.

Still referring to FIG. 1, the consumers 106, or web site visitors, on the other hand, are able to download music singles, from a variety of genres, for use free of charge. The advertising jingle appended to the beginning of all freely downloaded singles pays for this service. Consumers are not able to easily "remove" the jingle from the song. Therefore, each time the single is played, the user hears the advertisement. Once a user downloads a single, he or she can play the single on the computer using commercially available multimedia players. Alternatively, the user may save the audio file on, and transfer the file from, his computer to external multimedia playing devices, such as the Diamond Rio. This enables the user to hear the single away from his computer. In any event, whether the user plays the single on his computer, or plays the single on an external device, the user first hears the advertisement each time he listens to the song on the single.

Typically and preferably, an artist 114 delivers a song 118 to the web server 102 in MP3 format. The delivery of the song to the web server is preferably accomplished by means of uploading the song to a particular Internet web site. The artist's song 118 may also be available in other audio formats, such as the way format.

Similarly, typically and preferably, an advertiser 108 or a commercial sponsor delivers an audio recording of an advertisement 120 in the MP3 format. The delivery of the advertisement is preferably accomplished by uploading the audio file, containing the advertisement, to a particular Internet web site. The length of advertisements may vary. Advertisements may be three to five seconds long, or much longer, such as 30, 40, or 60 seconds. Advertisements 120 may exist in the MP3 format or other audio formats, such as the way format.

An advertiser or commercial sponsor 108 may request that an advertisement 120 be prepared for them. In this case, the advertisement is first recorded in way format and then converted to the preferred MP3 format. A digital audio recorder, or editor, is used to record the advertisement in the way format. A typical three to five second advertisement might say something like: "This song is brought to you by Diet Coke." However, as previously stated, longer advertisements or advertisements using both lyrics and music may be used.

In the preferred embodiment of the present invention, the preferred audio format, for both advertisements and songs, is the MP3 format. Other audio formats may also be used. For example, an audio file in the way format may be used. However, due to the large size of way files, transmission of way files over the Internet requires relatively long download or upload time-periods. This transmission time can be substantially reduced by conversion of the way file into an MP3 file. MP3 files are compressed audio files. Furthermore, MP3 files eliminate certain "unnecessary" sound frequencies which are not distinguishable by the average human ear. A typical five-minute song in the way file format may require fifty to sixty megabytes of data storage space. The same song file in the MP3 format will likely require less than five megabytes of data storage space. Thus, there is approximately a twelve-to-one compression ratio between a way file and an MP3 file.

In order to convert a way file to an MP3 file, a commercially available file conversion utility is used. In the preferred embodiment of present invention, the commercially available software MusicMatch Jukebox, developed by MusicMatch, is used as the conversion utility software. As one of ordinary skill in the art will appreciate, the use of this conversion utility simply requires the loading of the software, MusicMatch Jukebox, followed by opening of the way file within the utility. The MusicMatch software then allows the way file format to be saved in MP3 format. Similarly, other audio formats may be converted to the MP3 format by use of similar commercially available utilities.

Figure 2:
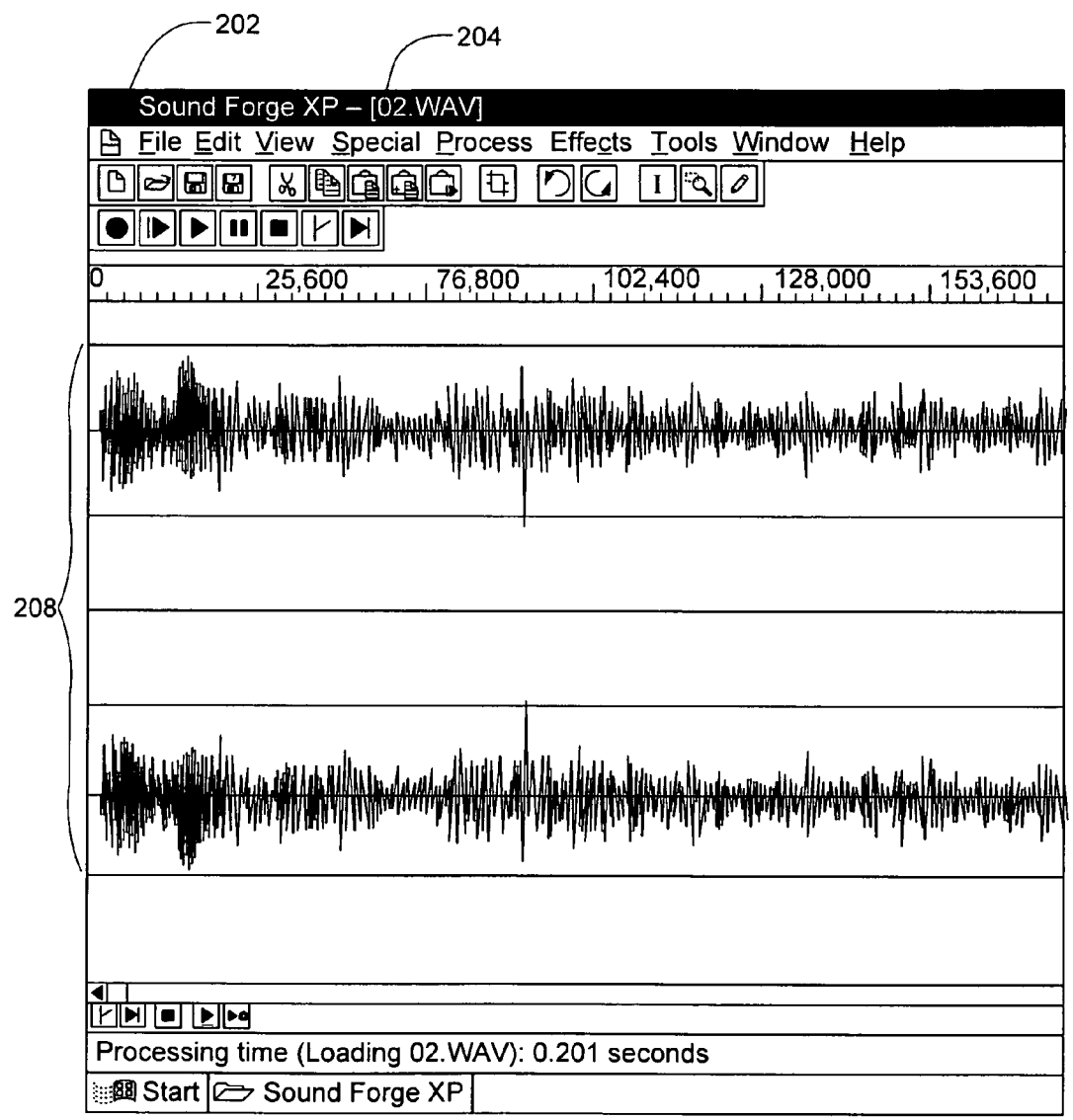
FIG. 2 illustrates a message way file in a sound editor.

Before a song is made available for public distribution (download) via the Internet, the song is combined with an advertisement, to form a single audio file. If the song and the advertisement are both in the way format, then the process of combining the song and the advertisement can be accomplished by a "cut-and-paste" process using a sound editor or recorder software, such as the commercially available Sound Forge XP for Windows, developed by Sonic Foundry, Inc. This way-file audio software process is described below:

Step 1. Using the sound editor or recorder software 202, the advertisement way file 204 is opened in a separate window of the software. See FIG. 2.

Figure 3:
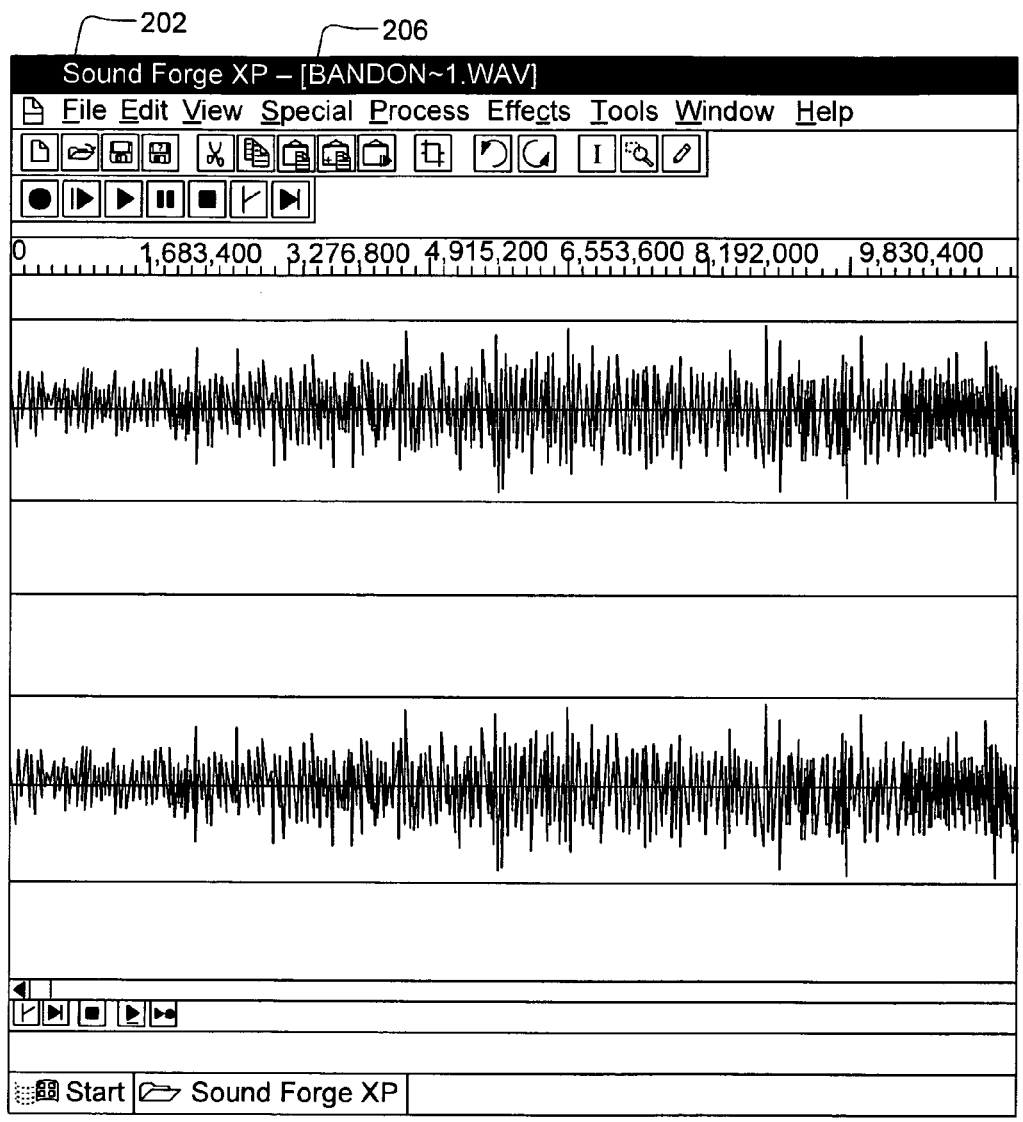
FIG. 3 illustrates a musical composition way file in a sound editor.

Step 2. The song way file 206 is then opened in another window of the software 202. See FIG. 3.

Step 3. The entire contents 208 of the advertisement file window (from step 1 above) are then copied into the Windows clipboard.

Figure 4A:
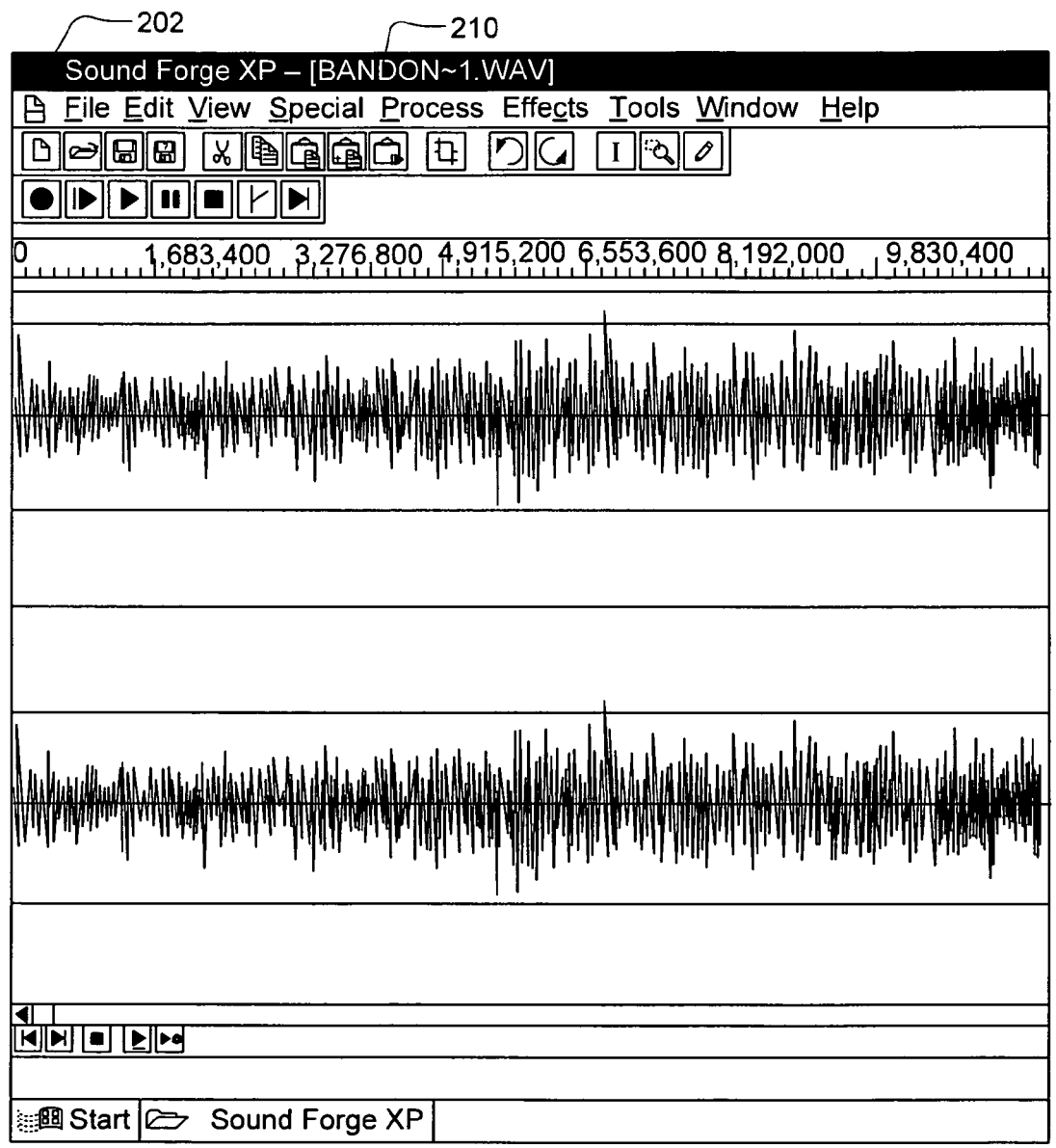
FIG. 4a illustrates the combined file of the invention in way format.
Figure 4B:
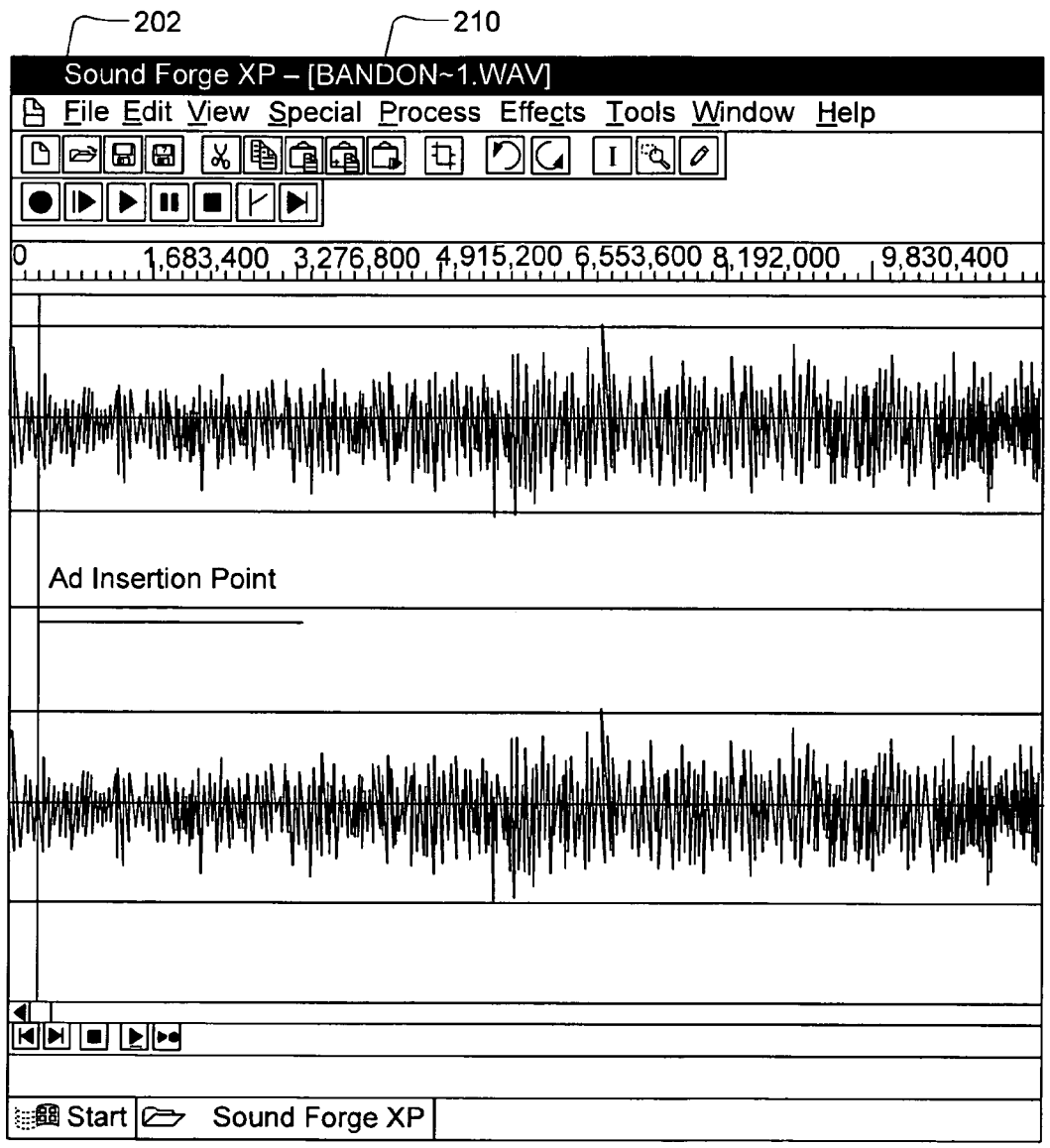
FIG. 4b indicates the insertion point of the advertising segment of the combined file.

Step 4. Next, the entire contents 208 of the Windows clipboard are pasted at the beginning of the song file (in step 2 above). This action appends the advertisement file in front of the song file. See FIGS. 4(a) and 4(b). FIG. 4(b) shows a line marking the advertisement insertion point.

Step 5. The combined file 210 (in step 4 above) is now saved as a new audio file containing both the advertisement 204 and the song file 206 (in that order). This combined audio file 210 remains in the way format.

The combined file 210, containing both the song, as well as the advertisement, is now ready for distribution over the Internet. However, as previously mentioned, audio files in way format are cumbersome to work with because of their very large size. Therefore, the combined file in way format is preferably converted into the MP3 format using the previously described process, using the MusicMatch JukeBox software.

Figure 5:
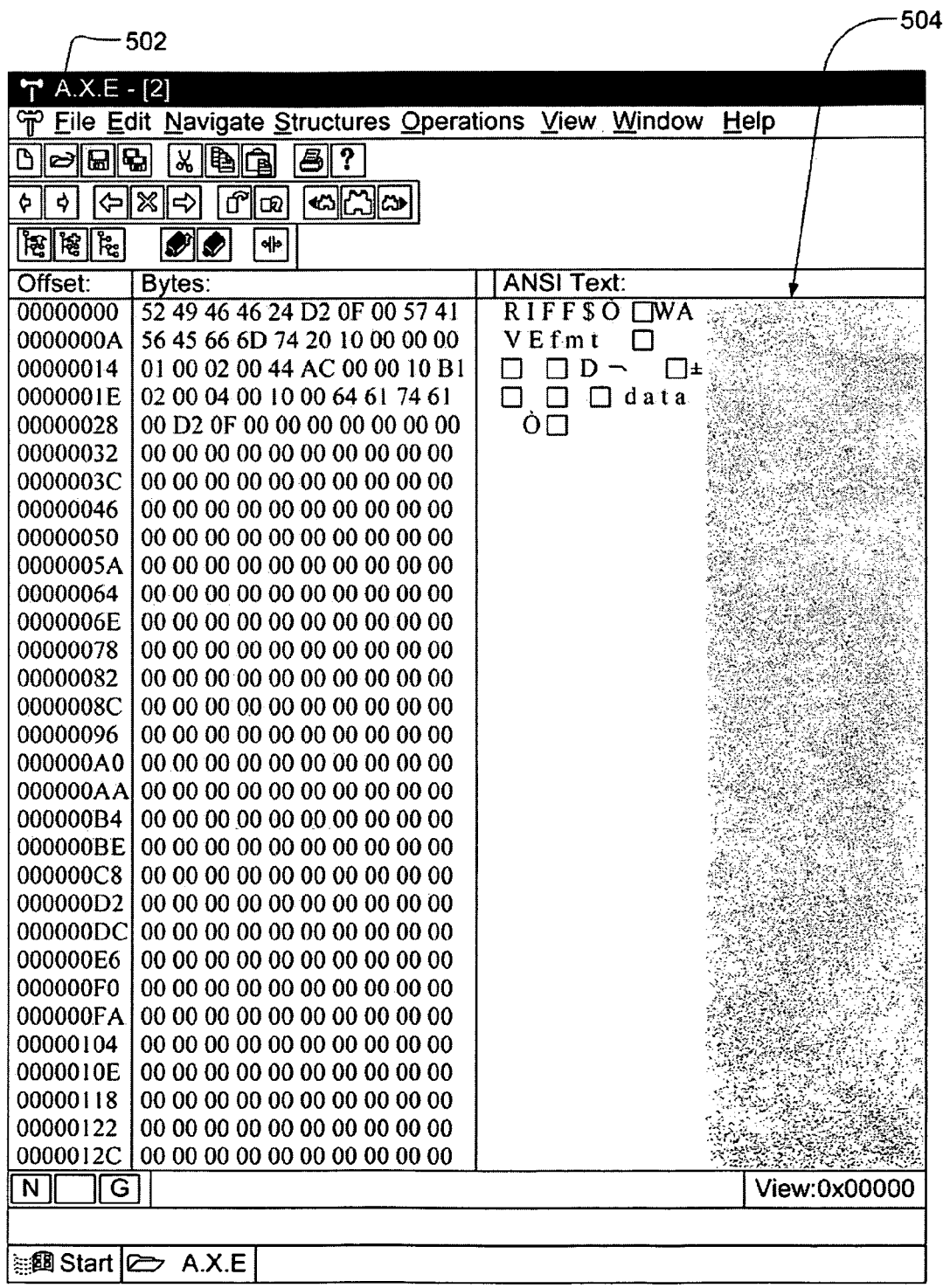
FIG. 5 illustrates a message file in a hexadecimal editor.

The above described 5-step way-file audio software process is a manual process and is not efficiently amenable for use in the high-volume commercial environment of an e-commerce Internet web site. Therefore, there is a definite need to speed up the process by use of a method that is amenable to efficient automation via computer programming. Furthermore, it is not efficient to work with audio files in the way format. As previously mentioned, way file formats require large storage spaces and require more computer processing time. The solution is found in the use of a method that uses the MP3 file format throughout the process of combining the advertisement file and the song file into a single audio file. More specifically, the solution is found in the use of a HEX editor that can work directly with binary files. An MP3 file is a binary file. In the preferred embodiment of the present invention, the HEX editor A.X.E. (Advanced HEX Editor for Windows by Benjamin Peterson) is used. This software makes it possible to conduct the process of combining the advertisement and song files using the MP3 format. Thus, eliminating the need for the conversion from the way format to the MP3 format after the combination process has been completed. However, if an artist or advertiser provides files in the way format or any other audio format, the file must be converted to the MP3 format before using the HEX-editor process described below:

Step 1. Open the advertisement MP3 file 504 in separate window of the HEX editing software 502. See FIG. 5.

Figure 6:
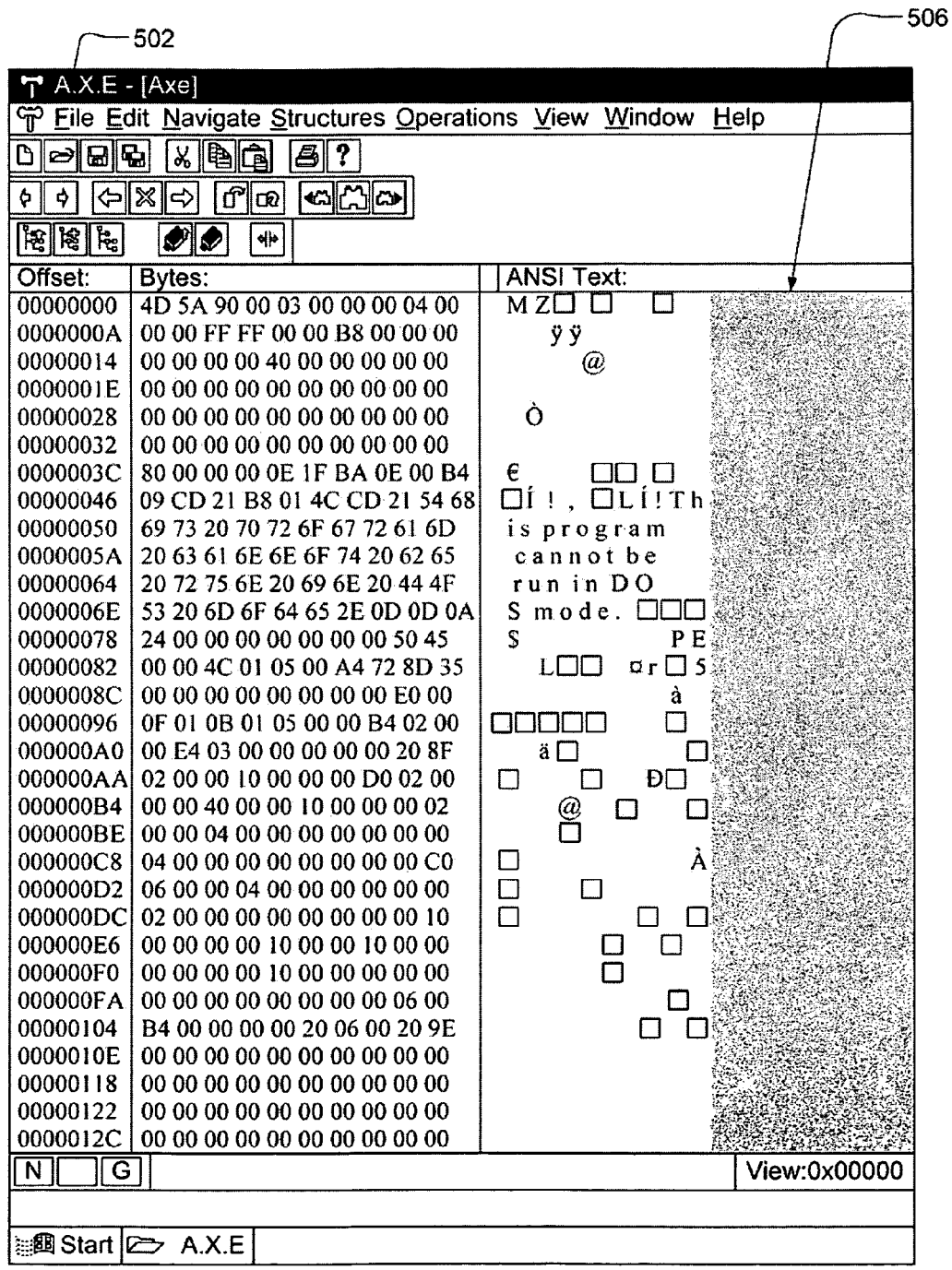
FIG. 6 illustrates a musical composition file in a hexadecimal editor.

Step 2. Open up the song MP3 file 506 in another window of the same software 502. See FIG. 6.

Step 3. Select all of the contents of the advertisement MP3 file 504 (from step 1 above) and copy it into the Windows clipboard.

Figure 7:
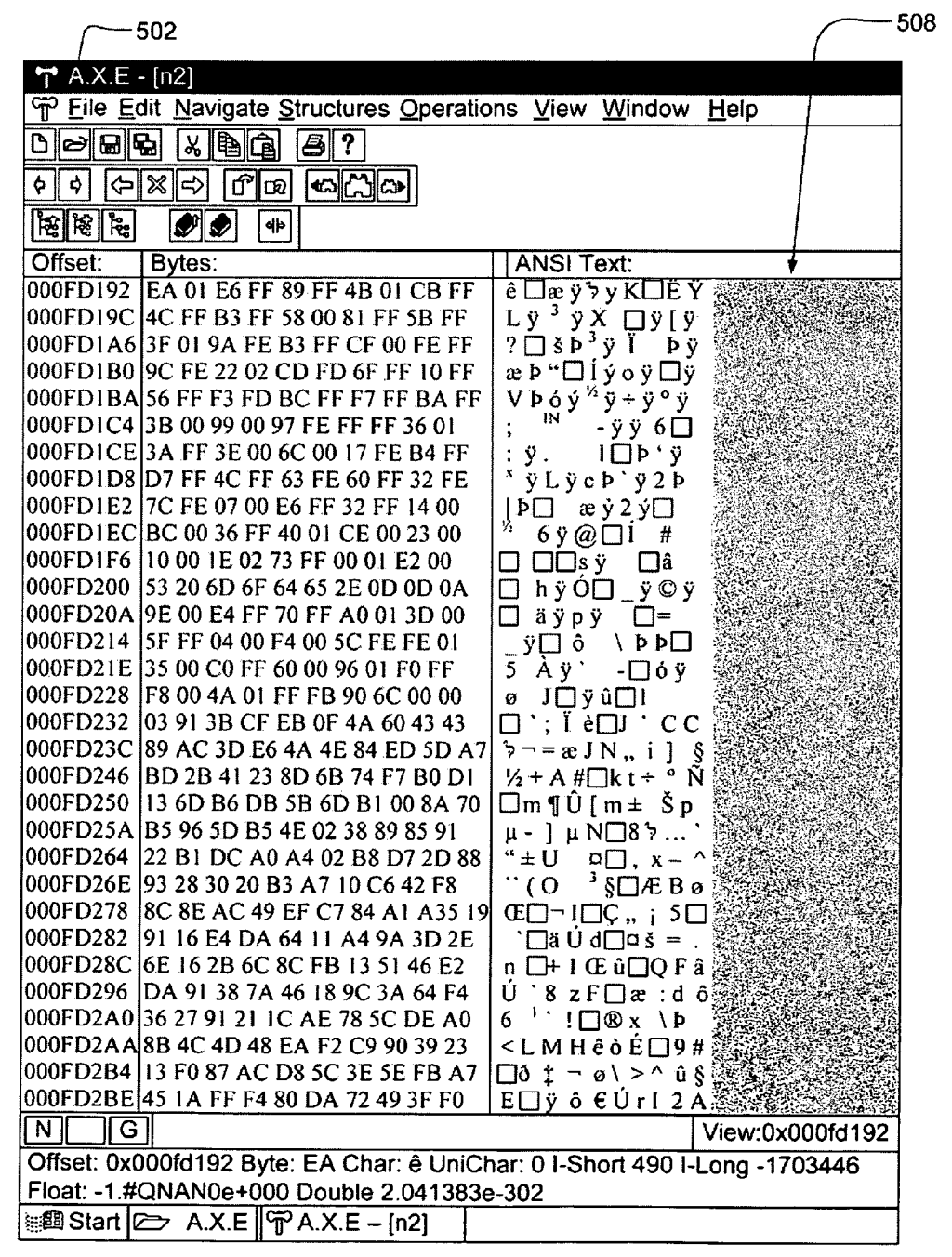

Step 4. Paste the contents of the clipboard (from step 3 above) in front of the song MP3 file (in step 2 above). See FIG. 7.

Step 5. Save the combined song 508 and advertisement MP3 file into a new file. The new file 508 is in the MP3 format.

The advantages of using the HEX-editor process, described above, as opposed to the way-file audio software process, described earlier in this disclosure, are the following:

1. The HEX-editor process is more amenable to automation, and more efficiently automated, by computer programming, than the way-file audio software process. When using the HEX-editor process, a computer program is dealing directly with hexadecimal code, i.e., a hexadecimal representation of the underlying binary codes (zeros and ones) representing the advertisement and song audio files. Computer programs are well suited for manipulation of binary data represented by hexadecimal code. Whereas, the way-file audio software process works with a graphical way representation of the underlying song or advertisement binary data file, the HEX-editor process works with the hexadecimal representation of the same data. Computer programs, in general, do not work as efficiently with a graphical representation of binary data, as they do with a hexadecimal representation of the same data.
2. The automation described in 1 above allows the process to be used in a commercial environment where high volume transactions occur.
3. As previously mentioned, the MP3 file format requires less storage space, thereby using less computer resources and being much more efficient in general.
4. No conversion is necessary from the way format to the MP3 format, after the HEXeditor process is completed. Advertisement and song files are converted to the MP3 format at most once if they are originally submitted in the way or any other audio format. When using the way-file audio software process, the combined file must be converted to MP3 format before it is made available for public distribution over the Internet.

Numerous variations and modifications will become apparent to those skilled in the art once the above disclosure is fully appreciated. It is intended that the invention embrace all such variations and modifications.

I claim:

1. A method of combining at least two audio files containing media into a new audio file, the method comprising:

receiving a first audio file that contains advertising content from a first party;

receiving a second audio file that includes non-advertising content from a second party;

creating a single combined audio file from the first and second audio files, the combined audio file being a single digital file in an audio file format that includes the advertising content of the first audio file in a portion of the combined audio file and the non-advertising content of the second audio file in another portion of the combined audio file;

making the combined audio file accessible for download to a plurality of users via a computer network;

transmitting the combined audio file to a at least one device where the entire combined audio file is saved for later playback;

receiving a payment from the first party for inclusion of the first audio file with the combined audio file; and distributing at least a portion of the payment as a royalty payment to the second party for the inclusion of the second audio file with the combined audio file, wherein the combined audio file is made accessible for download free of charge to the plurality of users, wherein the saved combined audio file can be played back repeatedly on the device, and the combined audio file is configured so that when the combined audio file is played back from a saved location on the device, both the first and second audio files are played, and wherein each time the combined audio file is played back, the portion of the combined audio file containing the advertising content is played before the portion of the combined audio file containing the non-advertising content.

2. The method of claim 1, further comprising transmitting the combined audio file to a plurality of devices onto which each transmitted combined audio file is saved for later playback.

3. The method of claim 1, wherein the royalty payment is calculated based on a number of times the combined audio file has been transmitted and saved by users.

4. The method of claim 1, wherein the act of receiving the first audio file comprises:

accepting an upload of the first audio file over a computer network.

5. The method of claim 1, wherein the act of receiving the second audio file comprises:

accepting an upload of the second audio file over a computer network.

6. The method of claim 1, wherein the act of receiving the first and second audio files comprise:

accepting an upload of the first audio file over a computer network;

accepting an upload of the second audio file over a computer network; and confirming that the first audio file and second audio file are in the same file format to facilitate combination of the first and second audio files into the combined audio file.

7. The method of claim 1, wherein the second audio file comprises a musical composition.

8. The method of claim 1, wherein the creation of the combined audio file comprises:

appending the first audio file to the second audio file, and saving the second audio file with the appended first audio file as a new audio file, the new audio file being the combined audio file.

9. The method of claim 1, wherein the second audio file consists of a music single of one song.

10. The method of claim 1, wherein the first audio file comprises an advertising jingle.

11. The method of claim 1, wherein the at least one device comprises a user's computer.

12. The method of claim 1, wherein the at least one device comprises an external playback device.

* * * * *